(12) United States Patent (10) Patent No.: US 8,166,847 B2
Bader et al. (45) Date of Patent: May 1, 2012

(54) MULTI-GROUP TRANSMISSION

(75) Inventors: Josef Bader, Friedrichshafen (DE);
Stefan Renner, Bodman-Ludwigshafen (DE)

(73) Assignee: SF Friedrichshafen AG, Friedrichshafen (DE)

( * ) Notice: Subject to any disclaimer, the term of this patent is extended or adjusted under 35 U.S.C. 154(b) by 932 days.

(21) Appl. No.: 11/913,717

(22) PCT Filed: Apr. 18, 2006

(86) PCT No.: PCT/EP2006/003511
§ 371 (c)(1),
(2), (4) Date: Nov. 28, 2007

(87) PCT Pub. No.: WO2007/019889
PCT Pub. Date: Feb. 22, 2007

(65) Prior Publication Data
US 2008/0190239 A1   Aug. 14, 2008

(30) Foreign Application Priority Data
May 11, 2005   (DE) .................. 10 2005 021 760

(51) Int. Cl.
*F16H 57/02* (2012.01)
(52) U.S. Cl. .................................. 74/606 R
(58) Field of Classification Search ............. 74/606 R, 74/606 A; 192/112, 113.2, 30 W
See application file for complete search history.

(56) References Cited

U.S. PATENT DOCUMENTS

| | | | |
|---|---|---|---|
| 4,043,222 A * | 8/1977 | Dudek | 74/606 R |
| 4,625,840 A | 12/1986 | Kojima et al. | |
| 4,678,006 A * | 7/1987 | Northman et al. | 137/596.17 |
| 5,411,450 A | 5/1995 | Gratton et al. | |
| 5,823,070 A * | 10/1998 | Taniguchi et al. | 74/606 R |
| 6,663,279 B1 | 12/2003 | Heinzelmann et al. | |
| 6,778,895 B1 | 8/2004 | Schwab et al. | |
| 7,032,730 B2 | 4/2006 | Härdtle | |
| 2002/0166410 A1* | 11/2002 | Yamane et al. | 74/606 R |
| 2003/0167877 A1* | 9/2003 | Yamane et al. | 74/606 R |
| 2004/0254040 A1 | 12/2004 | Somschor et al. | |
| 2006/0283275 A1 | 12/2006 | Bader | |

FOREIGN PATENT DOCUMENTS

| | | |
|---|---|---|
| DE | 196 30 155 A1 | 1/1998 |
| DE | 197 29 096 A1 | 9/1998 |
| DE | 199 15 471 A1 | 10/2000 |
| DE | 100 05 086 A1 | 8/2001 |
| DE | 199 46 560 A1 | 2/2003 |
| DE | 101 43 325 A1 | 3/2003 |
| DE | 102 55 179 A1 | 6/2004 |
| DE | 103 47 493 A1 | 5/2005 |
| EP | 0 170 465 A1 | 2/1986 |
| EP | 0 467 880 A1 | 1/1992 |
| EP | 0 541 035 A1 | 5/1993 |
| EP | 1 094 248 A2 | 4/2001 |
| EP | 1 216 368 B1 | 2/2003 |
| WO | WO-2005/037590 A3 | 4/2005 |

* cited by examiner

*Primary Examiner* — James Pilkington
*Assistant Examiner* — Thomas Diaz
(74) *Attorney, Agent, or Firm* — Davis & Bujold, P.L.L.C.

(57) ABSTRACT

A multi-group transmission (1) is proposed, comprising a gearbox actuator, in which an exhaust channel (3) is provided in the gearbox housing (2), said channel extending from a gearbox compartment (4) provided on the gearbox housing (2) for the installation of the gearbox actuator, to the output sensor (5), whereby the gearbox compartment (4) also serves as a collecting chamber for exhaust air.

7 Claims, 1 Drawing Sheet

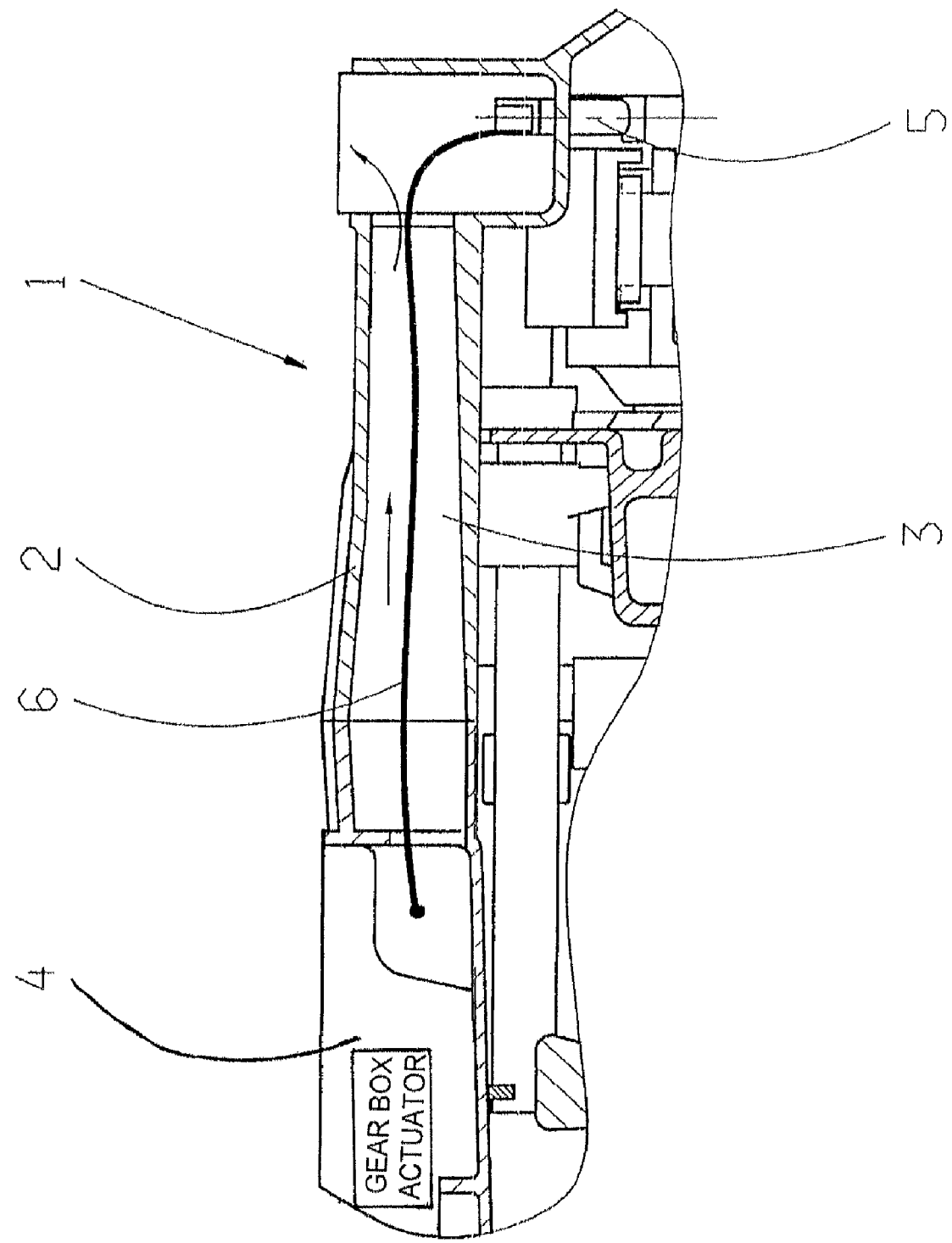

MULTI-GROUP TRANSMISSION

This application is a national stage completion of PCT/EP2006/003511 filed Apr. 18, 2006, which claims priority from German Application Serial No. 10 2005 021 760.5 filed May 11, 2005.

FIELD OF THE INVENTION

The invention relates to a multi-group transmission.

BACKGROUND OF THE INVENTION

Transmissions for commercial vehicles normally feature twelve, sixteen, or more gears. These types of multi-speed gearboxes are usually configured as multi-group transmissions comprising a front-mounted group, a main group, or as the case may be a main gearbox, and a range group. In order to facilitate the complex shifting sequence resulting from the plurality of gears, most of these transmissions feature a shifting device automated by a gearbox actuator. Shifts in the front-mounted group and the range group can thereby be done pneumatically, while shifts in the main gearbox are performed manually by the driver of the vehicle or can be performed automatically by means of suitable electrohydraulic, electropneumatic, or electromotoric gear shifting devices, or by a combination of these actuators.

Motor vehicle transmissions of this type have several components that correspond to different functions, and which are often integrated into the gearbox housing. Such components can, for example, be actuators, or as the case may be gearbox actuators or sensors.

This results in the necessity for simple and cost-efficient assembly of these components, as well as the replaceabilty of individual components. In addition, superfluous interfaces should be avoided.

An automotive transmission is known from the applicant's DE 103 47 493 A1, with a housing, in which, or on which torque-transmitting components are provided including a shifting device that is arranged between the vehicle transmission and a motor that drives the gearbox. In addition, actuating elements are arranged on the housing for actuating the torque-transmitting elements, whereby the housing comprises an area extending in the direction of the shifting device, in which area a connecting plate that can be permanently fixed to the housing is provided, in which accommodations are provided for at least some of the actuating elements for activating the torque-transmitting components. The actuating elements are preferably parts of a gearshift of a main gearbox or a splitting change-gear transmission and/or a range group transmission of the motor vehicle transmission.

In constructions that are known from the state of the art, in which a separate component is provided on the gearbox housing, which contains the working cylinder of the actuating devices and correspondingly integrated path sensors, the additional components provided are the channel plate, the valve plate, magnetic valves, a speed sensor, and a control unit. These components are affixed inside the cover of the gearbox actuator, which is mounted in a large compartment in the gearbox housing. Disadvantageously, a special coupling to the shift rods is hereby required.

In addition, the automatization components of the clutch actuator, that is the magnetic valves and the sensor, are integrated into the clutch actuator, which results in the necessity of an external wiring harness for the control unit (ECU) and a separate air connection. Hereby, in order to exhaust the gear actuator, seal contact areas must be provided on the housing. Disadvantageously, non-return valves are necessary to prevent back coupling of the compressed air. An additional disadvantage of this type of construction is that noise-damping measures are necessary, such as a woven fabric liner with a cover.

The present invention is based on the objective of presenting a motor vehicle transmission, configured as a multi-group transmission, comprising a gearbox actuator, in which the cited disadvantages of the state of the art are avoided.

SUMMARY OF THE INVENTION

Accordingly, a multi-group transmission is proposed, comprising a gearbox actuator, the housing of which contains an exhaust channel, which extends from a gearbox compartment provided on the gearbox housing, the compartment being intended for installing the gearbox actuator, to the output sensor, whereby the gearbox compartment serves as a collecting chamber for exhaust air.

According to an advantageous further development of the invention, the exhaust channel is also used as a wiring guide for the cables from the gearbox actuator to the output sensor that are required for the construction and connection devices, so that there is no longer a necessity for a external wiring harness. In addition, effective sound damping is achieved through the low flow velocities achieved in the channel.

BRIEF DESCRIPTION OF THE DRAWING

The invention will now be described, by way of example, with reference to the accompanying drawing in which:

The sole Figure is a schematic sectional view of a section of an inventive multi-group transmission.

DETAILED DESCRIPTION OF THE INVENTION

The sole Figure shows a section of the transmission. According to the invention, an exhaust channel 3 is provided in the housing 2, which extends from gearbox compartment 4 provided on the gearbox housing 2, which is intended for the preferably modularly constructed gearbox actuator, to the output sensor 5. The gearbox compartment 4 hereby serves also as a collecting chamber for the exhaust air, which passes through the channel 3. In the sole Figure, the air flow is visualized by the arrows.

According to the invention, the exhaust air channel 3 is used as a wiring guide for the cables 6 required for the construction and connection devices and extends from the gearbox compartment 4, or as the case may be from the gearbox actuator, to the output sensor 5. The exhaust channel can be cast or plugged in.

By means of the conception of the invention, the wiring passes through a protected area, which also features effective noise insulation. Advantageously, no non-return valves are required to prevent feedback of the compressed air, and no additional measures for noise insulation are necessary.

The invention claimed is:
1. An automotive multi-group transmission comprising:
a motor vehicle gearbox housing (2),
a gearbox compartment (4) extending from the gearbox housing (2) for installation of a gearbox actuator and receiving exhaust air from the gearbox actuator,
an output sensor communicating with an interior of the gearbox housing (2);
an exhaust channel (3) being formed in the gearbox housing (2) and extending from the gearbox compartment (4) to the output sensor (5), the gearbox compartment (4)

collecting exhaust air and the exhaust channel (3) facilitating exhausting of the exhaust air; and the exhaust channel (3) being a wiring channel for cables (6) which are required for construction and connection devices and which extend through an entire length of the exhaust channel (3) from the gearbox actuator to the output sensor (5).

2. The multi-group transmission according to claim 1, wherein the exhaust channel (3) is one of cast and stamped.

3. The multi-group transmission according to claim 1, wherein the exhaust channel (3) dampens noise.

4. An automotive multi-group transmission comprising:

a motor vehicle gearbox housing (2), a gearbox actuator being housed within a gearbox compartment, said gearbox compartment extending from the gearbox housing for installation of a gearbox actuator and for receiving exhaust air from the gearbox actuator, an exhaust channel (3) being supported by the gearbox housing (2) and extending from the gearbox compartment (4) to an output sensor (5) for venting the exhaust air that collects in the gearbox compartment (4) and flows through the exhaust channel (3) to the output sensor (5), and at least one cable (6) extending from the gearbox actuator through an entire length of the exhaust channel to the output sensor (5).

5. The multi-group transmission according to claim 4, wherein the exhaust channel (3) is one of cast and stamped.

6. The multi-group transmission according to claim 4, wherein the exhaust channel (3) dampens noise.

7. An automotive multi-group transmission comprising a main group and at least one of a front mounted group and a range group, the multi-group automotive transmission further comprising:

a motor vehicle gearbox housing (2) for accommodating transmission gears, a gearbox actuator, an output sensor (5) being supported by the gearbox housing (2) and communicating with an interior of the gearbox housing (2);

an exhaust channel (3) being supported by the gearbox housing (2) and the exhaust channel (3) extending from a gearbox compartment (4) to the output sensor (5), and the exhaust channel (3) having an exhaust vent for exhausting exhaust air to an external environment;

the gearbox compartment (4) accommodating the gearbox actuator and collecting the exhaust air from the gearbox actuator;

the exhaust air flowing from the gearbox compartment (4) through the exhaust channel (3) and out through the exhaust vent;

at least one cable extending from the gearbox compartment (4) along and through the exhaust channel (3) and being coupled to the output sensor (5); and the output sensor (5) directly communicating with the exhaust vent.

* * * * *